Patented Apr. 26, 1927.

1,625,826

UNITED STATES PATENT OFFICE.

MAXIMILIAN PAUL SCHMIDT, OF BIEBRICH-ON-THE-RHINE, GERMANY, ASSIGNOR, BY MESNE ASSIGNMENTS, TO GRASSELLI DYESTUFF CORPORATION, OF NEW YORK, N. Y., A CORPORATION OF DELAWARE.

MANUFACTURE OF VAT DYESTUFFS.

No Drawing. Application filed November 20, 1923, Serial No. 675,932, and in Germany November 25, 1922.

I have found that a very valuable vat-dyestuff is obtained by melting the imide of the methoxynaphthalene-dicarboxylic acid with caustic alkali. The coloring matter formed dyes the fibre a very valuable marine-blue of excellent fastness to chlorine.

The process may be carried out as follows. The parts are by weight.

*Example I.*—10 parts of the imide of the methoxynaphthalene-1.8-dicarboxylic acid, obtainable by heating with ammonia the methylether of naphthalene-1.8-dicarboxylic acid (see Ber. d. Deutschen Chem. Ges. 32, p. 3294) are added to 150 parts of caustic potash at a temperature of 180–190° centigrade while stirring and fused at this temperature for some time. After cooling the bluish-black melt is dissolved in water and oxidized with air or another oxidizing agent. The separated dye-stuff is filtered. With an alkaline hydrosulfite it yields a blue vat, from which cotton and wool are dyed in blue tints.

*Example II.*—50 parts of the imide of methoxynaphthalene-1.8-dicarboxylic acid are mixed with 500 parts of powdered potassium hydroxide and 500 parts of tetraline and heated to about 170°–180° centigrade while stirring, until the formation of the dyestuff is finished. The mass is then cooled and separated from the main quantity of the tetraline.

Afterwards water is added and the last part of the tetraline removed. Air is blown into the mass and finally the coloring matter drained off. From the alkaline filtrate further quantities of vat-dyestuff may be precipitated by treating cautiously with salt.

The dyestuff has the same properties as that described in Example I.

Instead of caustic potash also caustic soda, sodiumamide or mixtures of these bodies may be employed, which is of advantage in suitable cases. The fusing may be effected with or without the addition of a diluent or agents facilitating the condensation. Hitherto it could not be ascertained whether the obtained vat-dyestuff is one well defined chemical compound or a mixture of different compounds. But it seems, that it is in its essential part the diimide of dimethoxyperylenetetracarboxylic acid, having probably the formula:

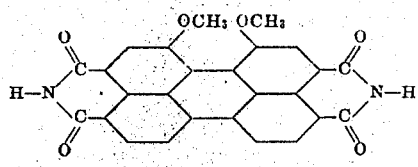

I claim:
1. Process of producing vat coloring matters consisting in melting the imide of methoxy-naphthalene-1.8-dicarboxylic acid with alkaline agents.

2. As a new product the vat dyestuff substantially identical with the product obtained by an alkaline fusion of the methoxy-naphthalene 1.8-dicarboxylic-acid-di-imide, which most probably is a mixture of isomeric dimethoxy-perylene-tetracarboxylic-acid-di-imides, which is a black powder with a metallic luster forming with an alkaline hydrosulphite solution a blue vat, from which cotton and wool are dyed blue shades.

3. As a new product the diimide of dimethoxyperylenetetracarboxylic acid having most probably the formula:

being a black powder with a metallic lustre forming with an alkaline hydrosulfite to a blue vat, from which cotton and wool are dyed in blue tints.

In testimony whereof I have signed my name to this specification.

MAXIMILIAN PAUL SCHMIDT.